UNITED STATES PATENT OFFICE.

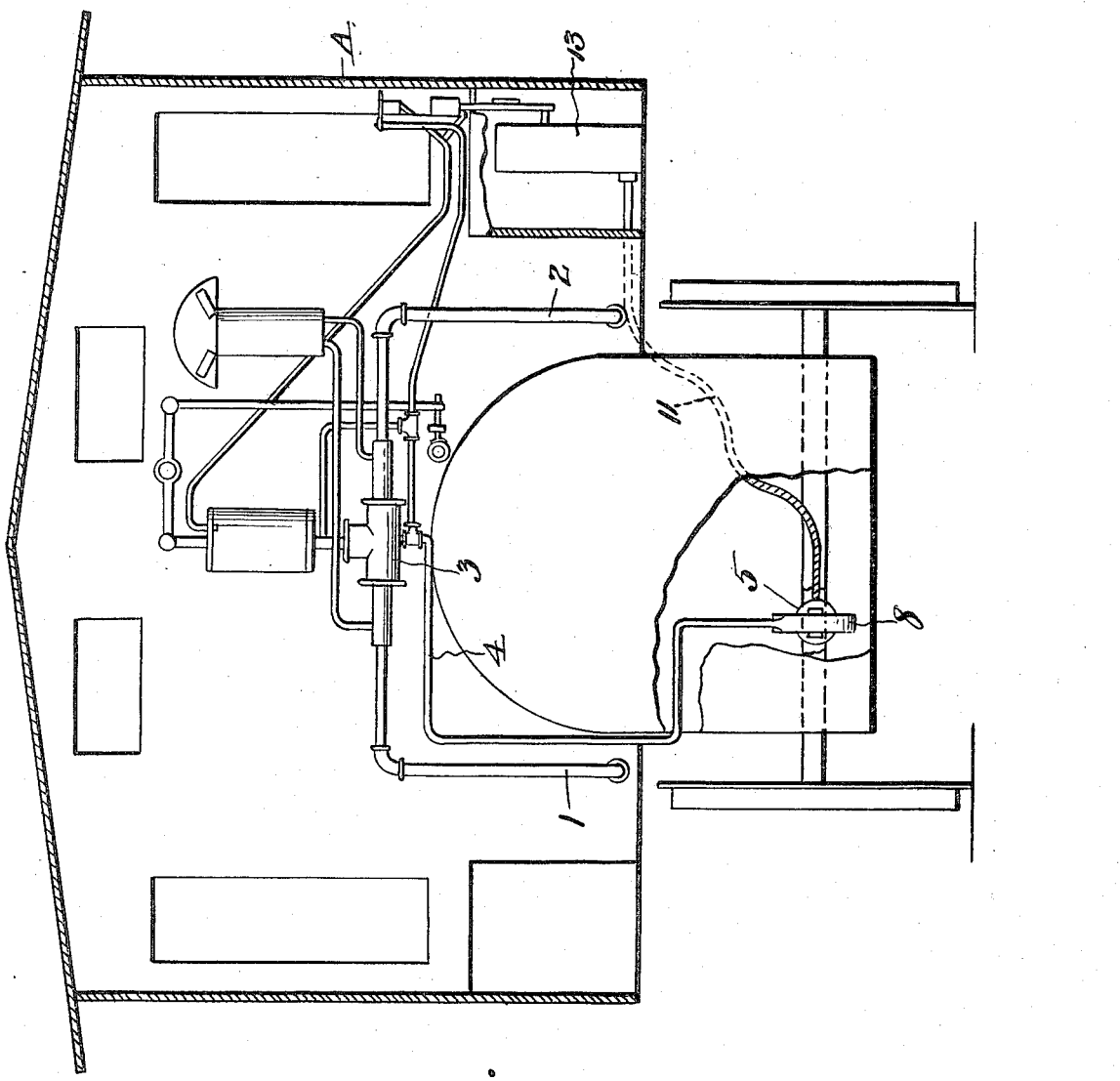

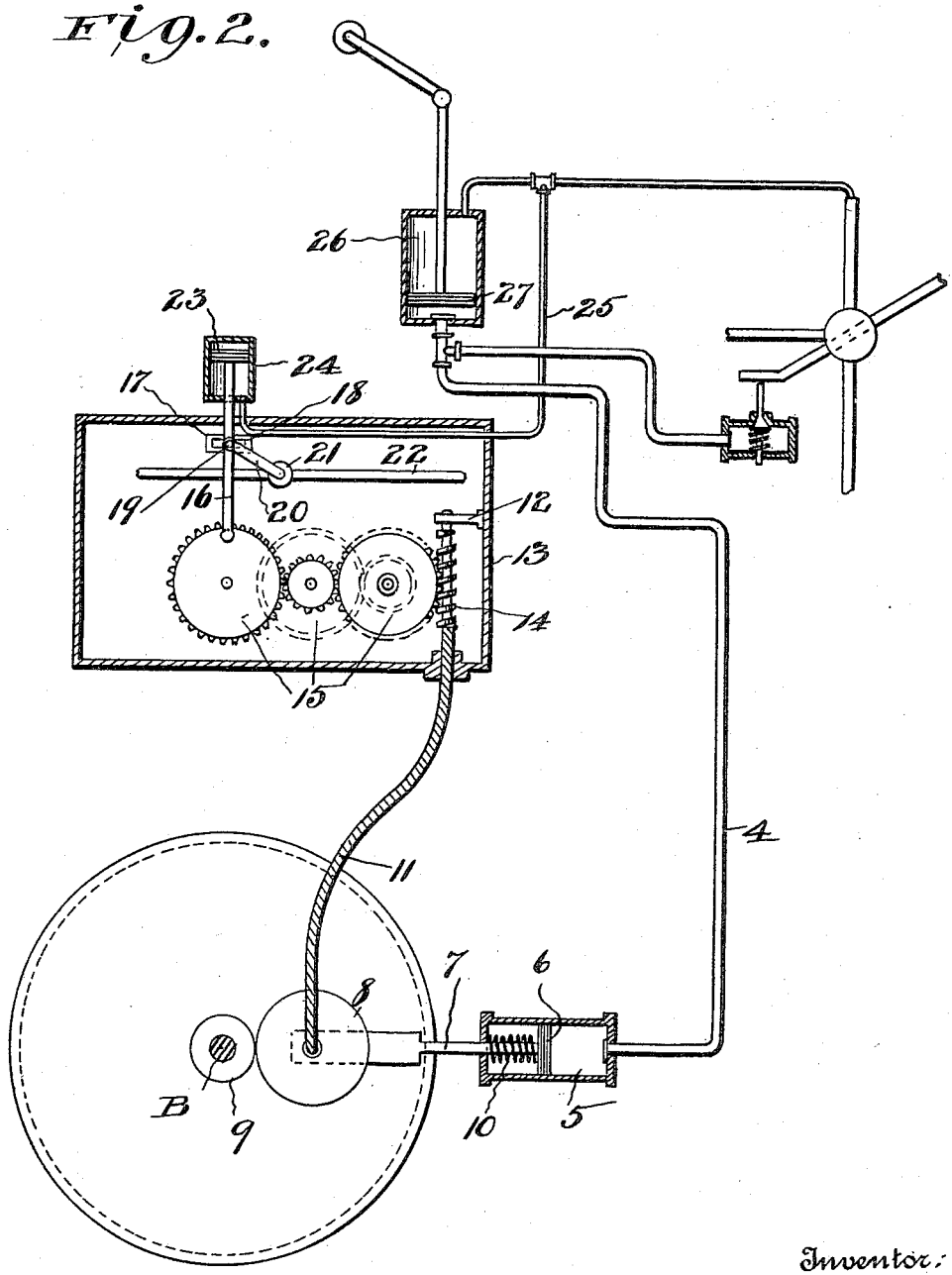

FRED BEDFORD, OF STRATTON, NEBRASKA.

BRAKE-ACTUATING DEVICE FOR AUTOMATIC TRAIN-STOP MECHANISM.

1,152,695.          Specification of Letters Patent.        Patented Sept. 7, 1915.

Original application filed June 26, 1913, Serial No. 775,918. Divided and this application filed July 10, 1914. Serial No. 850,113.

*To all whom it may concern:*

Be it known that I, FRED BEDFORD, a citizen of the United States, residing at Stratton, in the county of Hitchcock and State of Nebraska, have invented certain new and useful Improvements in Brake-Actuating Devices for Automatic Train-Stop Mechanism, of which the following is a specification.

The invention relates to devices for actuating the air brake valve on an air brake system for bleeding the train line and setting the brake automatically when the locomotive engineer goes by a signal that is set at danger, and has for its object the provision of means for actuating the valve by which a gradual release of the pressure of the train line is accomplished and thus preventing jar or shock to the train.

This invention was included in an application for patent entitled "cab device for automatic train controlling mechanism" filed June 26, 1913, Serial No. 775,918, and is a division of said application.

My invention will be described in detail hereinafter and illustrated in the accompanying drawings in which, Figure 1 is a view of the interior of a locomotive cab showing the brake actuating mechanism mounted therein, and Fig. 2 a diagrammatic view of the mechanism for actuating the brake valve.

In the drawings similar reference characters will be used to designate corresponding parts in both of the views.

In Fig. 1 is shown at 1 and 2 pipes that are connected with a main supply pipe, not shown, and having the air pressure in said pipes 1 and 2 controlled by valves actuated in any suitable manner and by any suitable brake device. The pipes 1 and 2 connect with a valve casing 3 mounted in the cab A of the locomotive, said valve casing having connected therewith a pipe 4 communicating with cylinder 5 in which is mounted a piston 6 having a rod 7 carrying a friction disk 8 that is adapted to engage a disk 9 secured to one of the axles B of the locomotive.

It will be understood that when air is admitted to the valve casing 3 and proceeds from said casing through the pipe 4 to the cylinder 5 the pressure of the air in said cylinder 5 actuates the piston 6 to move the friction disk 8 and said disk 8 will rotate with the axle B. When pressure is released in the cylinder 5 the disk 8 is moved from engagement with the disk 9 by means of an expansible spring 10 bearing against the head of the cylinder 5 and the piston 6.

Secured to the friction disk 8 is a flexible shaft 11 having its free terminal journaled in a bracket 12 mounted in casing 13 and provided with a worm 14 that meshes with one of a train of gears 15. Secured to one of the train of gears 15 is a rod 16 having secured thereto a transverse plate 17 provided with a slot 18 in which is slidably mounted a pin 19 secured to the arm 20 controlling a valve 21 in the air brake pipe 22. Mounted on the free end of rod 16 is a piston 23 slidably mounted in cylinder 24, and 25 indicates a pipe communicating with the lower end of cylinder 24 and connected with cylinder 26 to supply pressure in the cylinder 24 to lift the piston 23 and close the valve when it is desired to move the the train and thereby release the brakes, said cylinder 26 having a piston 27 mounted therein that is actuated in any suitable manner by the locomotive engineer.

Having thus described the invention what I claim is:

1. In an air brake system, a valve for controlling the pressure in said system having an arm secured thereto, a rod operatively secured to said valve arm, a train of gears, said rod being pivotally secured to one of the members of said train of gears, a flexible shaft suitably journaled and having a worm thereon meshing with one of the members of said train of gears, a friction disk secured to said flexible shaft, a rod member having a friction disk mounted thereon and adapted to engage the first mentioned friction disk, and means to move the first mentioned friction disk into and out of engagement with the last mentioned friction disk.

2. In an air brake system, a valve for controlling the pressure in said system having an arm secured thereto, a rod operatively secured to said valve arm, a train of gears, said rod being pivotally secured to one of the members of said train of gears, a flexible shaft suitably journaled and having a worm thereon meshing with one of the members of said train of gears, a friction disk secured to said flexible shaft, a rod member having a friction disk mounted thereon and adapted to engage the first mentioned friction disk, a cylinder, a piston reciprocally mounted in said cylinder, a piston rod secured to said piston and engaging the first mentioned friction disk, and a valve controlled air pressure system connected with said cylinder to convey air to said cylinder to move the piston and engage said friction disks with one another.

3. In an air brake system, a valve for controlling the pressure in said system, an arm secured to said valve, a rod having a lateral extension provided with a transverse slot, a pin secured to said valve arm and slidably engaging said slot, means to actuate said rod to open the valve, a cylinder, a piston in said cylinder and operatively connected with said rod, and an air supply pipe connected with said cylinder and adapted to supply air to said cylinder to move the piston therein and the rod to close the valve.

In testimony whereof I affix my signature in presence of two witnesses.

FRED BEDFORD.

Witnesses:
F. J. O'DONNELL,
C. H. ELLER.

Copies of this patent may be obtained for five cents each, by addressing the "Commissioner of Patents, Washington, D. C."